(12) United States Patent
Amerson et al.

(10) Patent No.: US 12,276,617 B2
(45) Date of Patent: Apr. 15, 2025

(54) METHOD FOR DEFECT DETECTION FOR ROLLING ELEMENTS

(71) Applicant: Schaeffler Technologies AG & Co. KG, Herzogenaurach (DE)

(72) Inventors: Ray Amerson, Rock Hill, NC (US); Balaji Chandrasekaran, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 364 days.

(21) Appl. No.: 17/841,993

(22) Filed: Jun. 16, 2022

(65) Prior Publication Data

US 2023/0408421 A1     Dec. 21, 2023

(51) Int. Cl.
*G01N 21/89* (2006.01)
*G01N 21/892* (2006.01)

(52) U.S. Cl.
CPC ..... *G01N 21/8901* (2013.01); *G01N 21/8922* (2013.01)

(58) Field of Classification Search
CPC ........... G01N 21/8901; G01N 21/8922; G01N 2021/8893; G01N 21/951; G01N 21/8851
USPC .......................................................... 382/141
See application file for complete search history.

(56) References Cited

U.S. PATENT DOCUMENTS

| | | | | |
|---|---|---|---|---|
| 4,764,969 A | * | 8/1988 | Ohtombe | G01N 21/9501 382/148 |
| 5,153,444 A | * | 10/1992 | Maeda | G06T 7/001 356/394 |
| 6,198,529 B1 | | 3/2001 | Clark, Jr. et al. | |
| 11,286,567 B1 | * | 3/2022 | Choi | H01L 21/67288 |
| 2002/0150286 A1 | * | 10/2002 | Onishi | G06T 7/0002 382/149 |
| 2016/0321794 A1 | * | 11/2016 | Wang | G02B 21/0092 |
| 2017/0292916 A1 | | 10/2017 | Yongying et al. | |
| 2019/0003983 A1 | * | 1/2019 | Al-Omari | G01N 25/72 |
| 2021/0342618 A1 | * | 11/2021 | Naito | G01N 21/8851 |

FOREIGN PATENT DOCUMENTS

| | | | | |
|---|---|---|---|---|
| CN | 109047033 | * | 12/2018 | ............ B07C 5/342 |
| CN | 113222901 A | | 8/2021 | |
| JP | 2018-072252 A | | 5/2018 | |
| KR | 10-1732830 B1 | | 5/2017 | |

* cited by examiner

*Primary Examiner* — Jerome Grant, II
(74) *Attorney, Agent, or Firm* — Volpe Koenig

(57) ABSTRACT

A method of detecting defects in a rolling element is provided herein. The method includes collecting visual data or information via a microscope assembly. This visual data is then processed and algorithms, filters, or other analytical tools or engines are applied to detect if any defects are present on the rolling element. The method includes automatically flagging or identifying any defects, and this step is then checked or verified by a user or different entity. Depending on input from the user, the defects can either be confirmed or can be identified as a false detection. Information from the user's decision-making process is then fed back into the system, processors, algorithms or other analytic aspects of the system. This information is then used to improve the accuracy of the detection algorithms. This disclosure provides an automated system and process for more efficiently and reliably identifying defects on rolling elements.

20 Claims, 11 Drawing Sheets

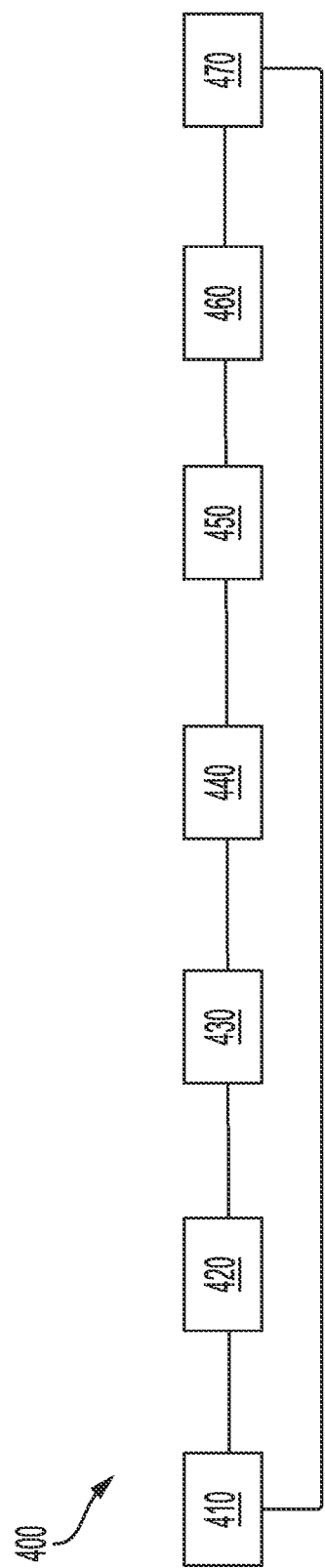

METHOD FOR DEFECT DETECTION FOR ROLLING ELEMENTS

FIELD OF INVENTION

The present disclosure relates to an inspection method for analyzing rolling elements.

BACKGROUND

Rolling elements, such as ceramic balls and steel balls, are used in a wide range of different industrial applications and settings. It is important to inspect these rolling elements prior to installation or use to identify any defects, such as surface defects. In some high precision applications, it is important to use rigorous inspection methods that analyze the entire surface of the rolling element. Known methods for performing this analysis include using stereo microscopic analysis and manual labor processes that include visually identifying the rolling elements for defects. This process can suffer from multiple deficiencies. For instance, this inspection process requires constant adjustment of lighting conditions provided by an external source to the stereo microscope. Defect identification also depends on human experience and subjective judgement, which inherently varies between individuals. This process therefore can encounter issues regarding human bias or inadequate training, and therefore lead to high error rates in the inspection process.

One common type of rolling element includes a spherical ball bearing, which can be difficult to photograph or image due to its geometry. The rolling elements must be rotated manually under the stereo microscope to obtain a 360 degree view of the ball. This rotation does not reliably cover 100% of the surface area due to variations in manual rotation process. It is desirable to detect defects such as scratches, cuts, missing sections, rust etc. at the micron level, and this makes the current manual approach challenging.

These processes lead to unidentified defects or false defect detections. Scaling the inspection system for handling large volumes of rolling elements requires costs, including infrastructure and labor.

It would be desirable to provide an automated inspection process and workflow that reliably identifies defects in a relatively short time period.

SUMMARY

A method of detecting defects in a rolling element is provided herein. The method generally includes arranging a rolling element in a microscope assembly. The microscope assembly is configured to scan an outer surface of the rolling element to obtain a plurality of surface images of the rolling element. The method includes associating each of the plurality of surface images with a specific region of the rolling element. The plurality of surface images are configured to be stored in a database. The method further includes identifying defects based on the plurality of surface images via a processing module using an initial set of analysis parameters. The method includes generating a plurality of interactive inspection icons associated with the plurality of surface images that each corresponds to a unique geographic region of the rolling element. The method includes displaying the plurality of interactive inspection icons via a user interface. The user interface includes an input interface including an approve option, such as an interface tool, button, etc., and a rejection option, such as an interface tool, button, etc. The method includes storing decisional information regarding selection of the approve option and the rejection option from the input interface in the database. Finally, the method includes updating the initial set of analysis parameters based on the decisional information.

The method can further include providing the plurality of surface images to the database in real time. The method can also include identifying the defects on the rolling element via a processor or AI engine that is configured to identify defects based on a predetermined set of analysis parameters.

The user interface can be configured to display a two-dimensional image associated with the plurality of surface images. In another embodiment, the user interface is configured to display a three-dimensional image of the plurality of surface images.

The plurality of interactive inspection icons can be generated and displayed in real-time while the microscope assembly scans the rolling element. The method can also include identifying at least one of: (i) a defect type on the outer surface of the rolling element, or (ii) a size of a defect on the outer surface of the rolling element.

The plurality of interactive inspection icons can include at least one indicia that is representative of a defect condition. In one aspect, the indicia is configured to correspond to a level of severity of any defects on the outer surface of the rolling element in a specific geographic region.

At least one visual characteristic of the plurality of interactive inspection icons can be configured to modified based on the level of severity of any defects that are automatically detected.

The method can also include generating and displaying additional information regarding the corresponding geographic region of the rolling element via engagement of the plurality of interactive inspection icons on the user interface. For example, a user can click a cursor or mouse icon on interactive inspection icons to access additional information or data.

The method can also include displaying at least one image of the corresponding geographic region of the rolling element based on engagement of the plurality of interactive inspection icons on the user interface.

Additionally, the method can include generating a report including the surface images and the decisional information. This report can then be used for future analysis.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 4 illustrates an exemplary workflow for one aspect of analyzing a rolling element.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
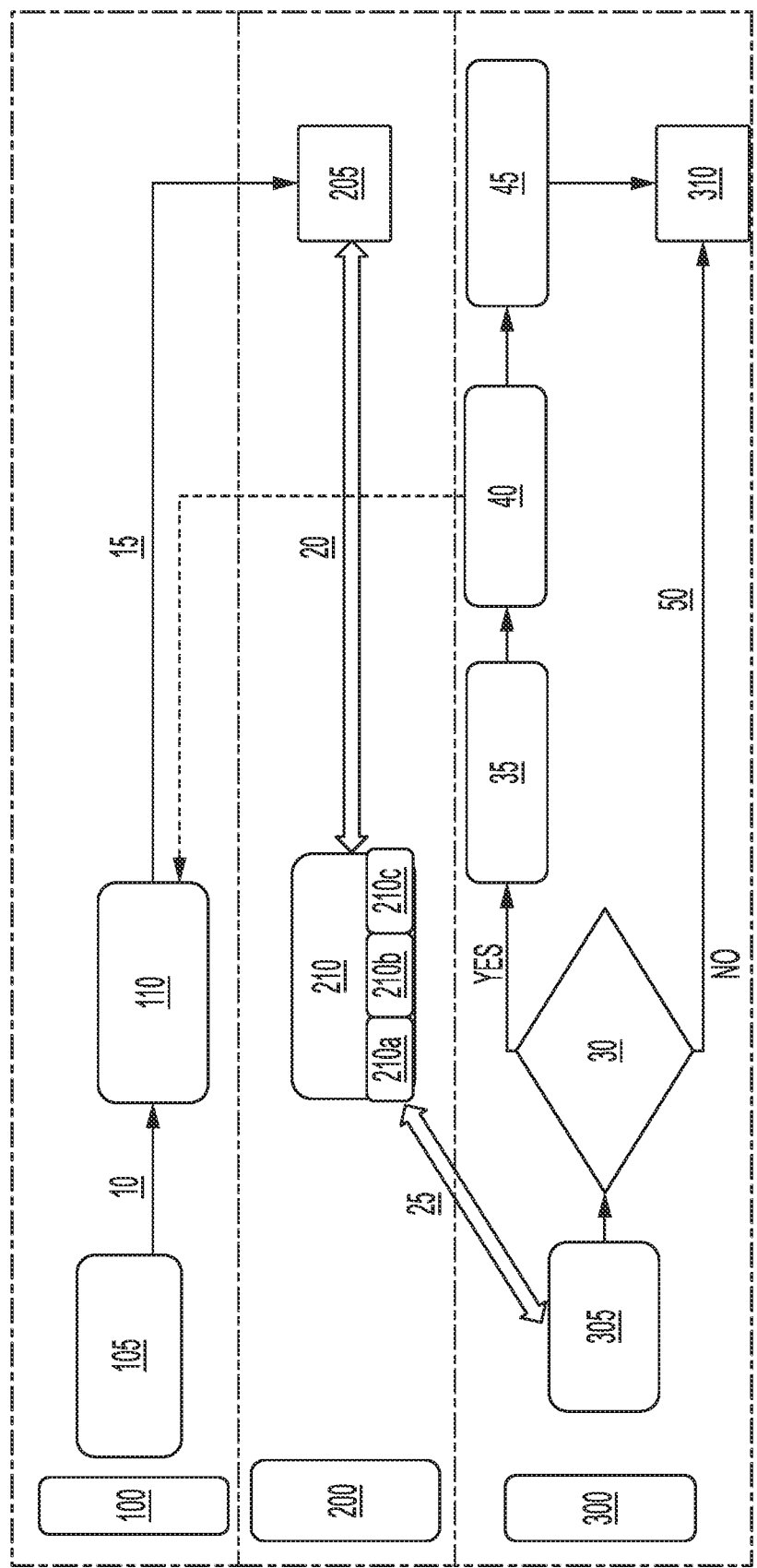
FIG. 1 is a work process flow diagram for a defect detection process or method.

The process shown in FIG. 1 provides an arrangement that fully automates and provides digitalization of workflow combining confocal microscopy, Artificial Intelligence (AI) deep learning vision algorithms, interactive web application, and a connected database for full traceability covering near 100% surface area and near 100% defection detection. In one aspect, 100% surface analysis is provided by the present disclosure. This analysis can be ensured via overlapping adjacent areas or regions that are scanned and overlaying these images or data associated with these images with each other. In one aspect, the system comprises a confocal microscopy component, real time data acquisition and streaming component, AI imaging analytics engine component, internet application component, and a cloud infrastructure component for database streaming connectivity.

As shown in FIG. 1, an inspection module 100 is provided. The inspection module 100 can include a microscope 105, such as a confocal microscope. In one aspect, the confocal microscope can include a Mahr MarSurf CM Explorer confocal microscope. One of ordinary skill in the art would understand that other types of automatic confocal systems could be used, such as Zeiss SmartProof, or any system that utilizes an automatic positioning or rotating stage. The microscope software can be synced to an automatic stage and can be configured to automatically jog or move and capture surface scanning information of the rolling element.

One of ordinary skill in the art would understand that the inspection module 100 can be configured to analyze rolling elements, such as ball bearings or rollers, or any other type of bearing component, or other surfaces for elements. More specifically, a first computer processing unit (CPU) 110 can be provided that is electronically connected, either directly or wirelessly, to the microscope 105. The first CPU 110 can include an interface for receiving and transmitting data, a memory unit, a user interface, a monitor or display, a processor, and other known electronic components. In one aspect, the first CPU 110 can comprise a Mahr CM Select Edge computer. One of ordinary skill in the art would understand that other computer systems, such as systems commercially available from HP, Dell, or other manufacturers could be used. One of ordinary skill in the art would understand that other computing units and processors could be used.

The first CPU 110 can be configured to generate a three-dimensional view of the surface area of the rolling element, and can provide surface scan information at the micron level. The first CPU 110 can be configured to adjust optical parameters, such as lighting and focus. In one aspect, software or other interface tools can be implemented that allow optimization of magnification of the lens to the surface area coverage of the sample. For example, a range of magnification can be provided by the system that allows anywhere from 5× the magnification to at least 100× the magnification, as well as any intermediary values. Through a user interface, such as element 305, metadata can be used to configure the first CPU 110 and the microscope 105. Input information, such as size input, material type, rolling element type, etc. can be entered via the user interface 305.

The first CPU 110 can be configured to automatically scan the rolling element and capture imaging data. In one aspect, the first CPU 110 is configured to drive a positioning stage, such as an X-Y stage platform or mobile stage platform. Positioning of the stage can be configured or programmed to begin at a first grid or row, and then move from left to right. After reaching the end of the first row, the stage can be configured to move to the next row, and again move left to right. This process can be repeated until reaching the end of the sample or rolling element. In one aspect, the imaging data is obtained in a grid pattern. One of ordinary skill in the art would understand that other optical scanning patterns could be used. This imaging data can then be transmitted instantly and in real-time for further processing.

The imaging data can be transmitted from the inspection module 100 to a computing module 200, which can include at least a database 205 (i.e. a data storage unit) and a processing module 210 (i.e. an imaging analytics and processing unit). The database 205 can be configured to receive and transmit data to and from the inspection module 100. The database 205 can include any combination of any commercially available structured databases (such as SQL) and unstructured databases (such as MongoDB). The database 205 can be configured to store and track metadata information, such as testing conditions, traceability of the rolling elements tested, operator interactions etc. In another aspect, the database 205 can be configured to store 2D flattened images or 3D surface scan measurements.

In one aspect, the database 205 can be directly connected to the inspection module 100, or can be wirelessly connected to the inspection module 100. Information, signals, and data from the microscope 105 can be stored in the database 205, such as via a cloud-based or an on-premise data collection and storage configuration. The microscope 105 can be configured to transmit or stream multi-dimensional information about each grid that is analyzed of the rolling element. In one aspect, this information is stored in a Flexible Image Transport System (FITS) format. One of ordinary skill in the art would understand that the format of this data and information can vary.

In one aspect, custom data pathways or pipelines can be configured to integrate and implement tools from third party cloud computing resources, such as Microsoft Azure, Amazon Web Services (AWS), Google Cloud, etc., for data transfer between the microscope 105 and the database 205. Data can be shared or transferred by network folder sharing for on premise databases and storages, microservices configured to stream data to the cloud, or data pipelines to monitor data availability and streaming uploads.

In one aspect, the database 205 is configured to store reports and other data logs, such as defect reports, and also log and track information regarding human interactions and decisions. This information is stored such that decisions and information can be traced or logged for additional analysis. Additionally, the database 205 stores information regarding algorithm performances for model monitoring and retraining purposes.

The user interface 305 can be configured to display the status of each grid that is inspected with a color status to indicate a defect was found. A user can agree with the identification of a defect, or override it as a false positive detection. Similarly, if the system failed to identify a defective grid, a user can override this decision as a false negative. The user interface 305 and the database 205 can be configured to log or record all instances of true positive, true negatives, false positives and false negatives. This information is subsequently used for training the system to improve the defect identification accuracy.

The processing module 210 receives information from the microscope 105. In one aspect, this information is provided in the FITS file format. This information includes data regarding focal parameters of the microscope, field of view, optical parameters (such as intensity of reflected light from the surface), focal area of interest captured during rotation, among other data.

The processing module 210 can include various aspects, such as a pre-processing engine 210a, an AI vision solution engine 210b, and a post-processing engine 210c. The pre-processing engine 210a can be configured to handle the multi-dimensional data stream from the microscope, such as in a grid by grid format. The pre-processing engine 210a can be configured to apply mathematical transformation (such as a least square fit function) to translate three-dimensional surface scan data to two-dimensional color-coded spectral images. The pre-processing engine 210a can also be configured to apply image processing techniques, such as noise removals, segmentation for removing unwanted regions, etc. The AI vision solution engine 210b can be configured to identify defects for the pre-processed images. For example, in one aspect, different types of surface defects samples can be identified by users of the system and can be marked with bounding box locations with the defect type on a 2D color mapped surface image. These images, along with accompanying user comments or annotations, can be used for configuring or training the AI vision solution engine 210b.

In one aspect, the processing module 210 is configured to receive three-dimensional imaging data and information from the microscope 105 via the CPU 110 and database 205. Once this information is received by the processing module 210, the processing module 210 can process the information such that any three-dimensional imaging data or information is converted to a two-dimensional format. This process can include flattening or converting the data or information. For example, the data can be "flattened" or converted such that any three-dimensional information or data is visually represented in two dimensions. This process can include producing or generating the images shown in FIGS. 5C and 5D. Referring to FIG. 5C, any scratches or defects can be shown with a varying color or characteristics instead of a depth in three dimensions.

Alternatively, the imaging data from the microscope 105 can also be processed such that it remains in a three-dimensional format. Additional processing modules or software can be implemented to convert or process the data from the microscope 105.

The pre-processing engine 210a can generally be configured to receive a multi-dimensional FITS file or other data from the microscope. The pre-processing engine 210a can synthesize, organize, or otherwise process this information and convert or process the information into a two-dimensional format. By converting this data or information into a two-dimensional file, a deep learning algorithm can then further handle or process the information or data. The pre-processing engine 210a can be configured to run or perform a series of algorithms or processes that are configured to remove noise (i.e. noise removal modules), segment the data for region of interest (i.e. segmentation for region of interest modules), drift removal, surface correction, and transformation from curved surfaces to flattened surfaces. Such algorithms or processes can use curve fitting techniques, such as least squares fit, Mel-Penrose pseudo inverse solutions, or other conversion or processing techniques. In one aspect, convex optimization and linear algebra methodologies can be used.

The AI vision solution engine 210b can be used to further process the data, for example via a transfer learning process. In one aspect, a R-CNN architecture can be implemented by this engine. The deep learning module can also use other vision architectures. For example, Resnet, InceptionNet, Mobilenet, EfficientNet, vision transformers or other architectures can be implemented. These architectures contain several layers ranging from twenty to two hundred, or greater, of connected neurons. The AI vision solution engine 210b is configured to be preloaded or trained with millions of images that are available for opensource adoptions. These models or modules can be configured for surface error detection by a method known as transfer learning. The vision network architectures mentioned above can contain a series of cascaded layers of neurons. These neurons are trained (i.e. loaded or otherwise pre-configured) with millions of images, such as from publicly available sources, and are configured to extract and segment features from these images. By this transfer learning approach. the initial neural network informational (i.e. weights) layers are kept intact which captures different features from the 2D images. The higher layers are trained by providing defect images that are annotated by a user. By applying transfer learning approach, these vision models are trained to capture different surface defects.

A post-processing engine 210c can also be implemented. After the AI vision solution engine 210b identifies the defective region and communicates that information, such as bounding box coordinates, pixel locations, or other information, the post-processing engine 210c then is configured to process this information. The post-processing engine 210c can be configured to transform the information into measurement of the defect found (such as in micron units). This information regarding the defect can include the width and depth of the defect that was found, as well as type of defect or other information. This information is then transmitted for further analysis and processing, for example to the user interface module 300. In one aspect, the post-processing engine 210c is configured to analyze image data or other information associated with a particular defect and is further configured to calculate a depth, width, and other geometric information regarding that specific defect. This information can later be accessed by a user to determine the exact size of a specific detected defect.

The user interface module 300 can be considered a workstation. The user interface module 300 can provide a central module for merging information from the analytics engine, database, microscope, etc., and allowing a user to interact with various aspects of these components. For example, the user interface module 300 can include a display that is configured to show surface scan information and data, associated with each grid, or in various types of configurations. Results or processed data from the processing module 210 can also be viewed, processed, manipulated, or otherwise engaged via the user interface module 300. Personnel can interact with the user interface module 300 to review data and information from any of the other modules, engines, microscope, databases, etc.

In one aspect, a plot of grids can be generated for the user to view and review on the user interface module 300. In one aspect, the user interface module 300 can include a user interface 305, which is also referred to herein as a workstation. The user interface 305 can include any user interface or application. For example, the user interface 305 can include any commercial desktop or laptop running the user interface as web application or Android or IOS tablet system running the user interface as mobile applications.

A user can provide decisional feedback regarding whether to accept or reject a particular rolling element based on defects found by the system. This decision can be based on various information generated by the system, such as the defect type, measurement parameters, and measurement predictions. Examples of measurement predictions can include type of defect, location of the defect, length and depth estimates by the AI engine, etc. One of ordinary skill in the art would understand that other measurement predictions could be used.

Figure 3A:
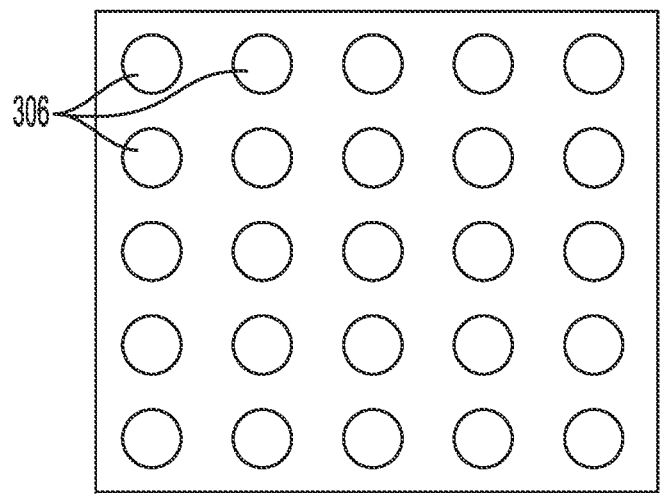
FIG. 3A is an illustration of grid inspection data according to one aspect.
Figure 3B:
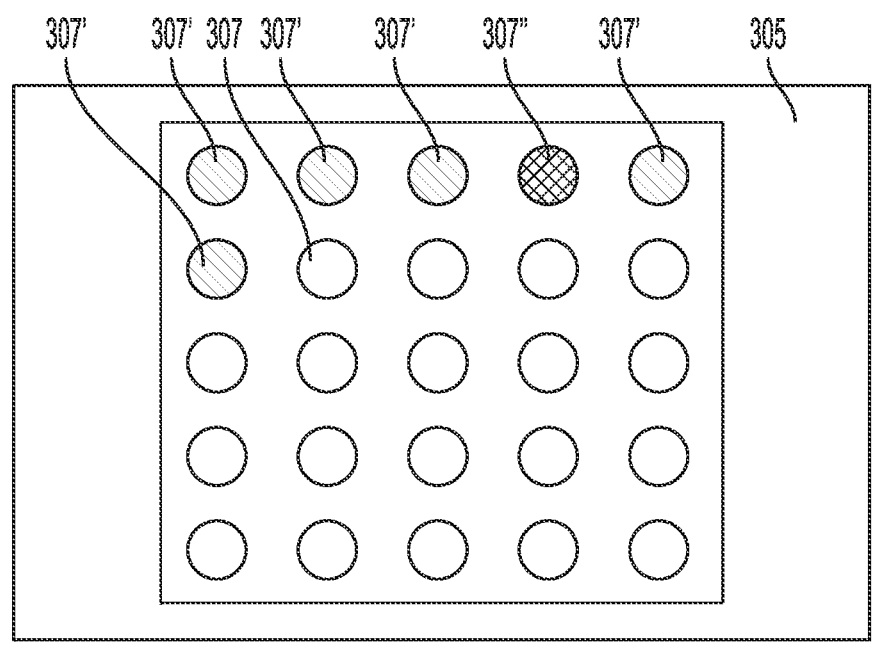
FIG. 3B is a visual representation of rolling element inspection grids.

As shown in FIG. 3B, the information regarding surface characteristics of the rolling element from FIG. 3A, i.e. the grid of two-dimensional information or data or grid inspection information, is ultimately presented to the user via the user interface 305. Specifically, the user interface 305 can display a graphical representation of the grid of surface characteristics. In one aspect, each interactive inspection icon 307 (hereinafter referred to as icon) on the display represents a predetermined surface area having a unique geographical position on the rolling element. Based on the algorithm and processes disclosed herein, each icon 307 is assigned a particular characteristic indicating whether a region or area associated with that icon 307 includes a defect that meets a predetermined threshold or not. For example, if a specific area does not appear to include any defects, then the particular icon 307 can have one characteristic or visual indicia 307'. In one aspect, these icons can be assigned the color green, or a first hatching pattern, thereby indicating no significant defects are present. In another aspect, areas that appear to have a surface defect exceeding a predetermined threshold are assigned a different characteristic or visual indicia 307". In one aspect, these icons can be assigned the color red, or a second hatching pattern, thereby indicating a defect is present. Detection of these defects at this stage can be fully automated. For example, the processing module 210 can be configured to carry out a comparative algorithm that analyzes images obtained by the microscope 105 and compares those images to stored images of defects that were previously identified as being above a predetermined threshold. In one aspect, the predetermined threshold can be based on the geometry (i.e. size, depth, etc.), or type of defect. In one aspect, any deviation from a smooth surface is identified as a deviation, and can include pitting, scratches, dimples, bumps, or other surface imperfections.

In one aspect, the processing module 210 is configured to determine the geometric characteristics of a surface area from the images from the microscope 105 and is configured to measure defect parameters based on the images. If the measurements that are calculated by the processing module 210 exceed a predetermined threshold (i.e. depth of defect, size of defect, etc.), then the processing module 210 can be configured to identify a significant defect in the particular area or region associated with that image. The characteristics of the icons 307 can be updated in real-time or dynamically as the processing module 210 is carrying out this analysis and determinations. Therefore, the icons 307 will sequentially be updated, such as filled in with the color red or a first hatching pattern for a significant defect, or filled in with the color green or a second hatching pattern for no significant defects detected. A user can dynamically select each of the icons 307 after the icons 307 have been modified based on the analysis by the processing module 210. For example, if one of the icons 307 has been updated to indicate that the specific area associated with that icon 307 lacks any significant defects, then the user can select or click that specific icon to confirm that no significant defects are present. A cursor or other element can be provided that is configured to move based on a user engaging a mouse or touchscreen associated with the user interface. Selection of the icon is configured to access or retrieve the source information or data related to that specific icon. In one aspect, selection of the icon 307 by the user is configured to display the images from the microscope 105 for that specific area of the rolling element. The user can then perform further analysis of the area associated with that area. In the event that the user determines a specific icon 307 that originally had an indication of no significant defects does in fact have significant defects, then the user can reject the rolling element via engagement with a rejection or reject button or option. In addition to addressing the specific rolling element that was being analyzed, this process is useful because the decisional information and the associated rolling element surface information is repurposed or used by the system. In one aspect, the decisional information teaches the system such that the system is adaptive or learning based on user input. All the user decisions regarding the true positives, true negatives, false positives, and false negatives relative to the detections or decisions made by the system are captured and stored in the database. This information is used to further train the processing module 210.

The processing module 210 is configured to periodically update its algorithm to learn from a particular set of images and human/user input or decisions. This updating can be performed in an offline mode, when active inspections are not occurring. In one aspect, the user's input teaches or updates the algorithm such that the user's expertise on analysis of defects can be automated via the algorithm. Alternatively, if an icon 307 includes an indication of a significant defect, a user can also check whether such a significant defect is in fact present by checking the associated data or information with that icon. For example, a user can review the images associated with a particular icon and may determine that the defects are not significant.

Decisions made by the user regarding whether to accept or reject a part or rolling element can be saved and stored by the system, such as via a local database 310 or other data storage unit. This decisional information can then be used by any aspect of the system, such as by the AI vision solution engine 210b, to improve the system's accuracy rates with respect to detecting defects and the severity (i.e. pass or fail) of these defects.

In one aspect, the analytics components of the system can be deployed in a cloud, such as a scalable Kubernetes cluster or in an on-premise commercially available EDGE system, which can be scaled smaller or larger depending on the specific requirements of a system. The AI system can process higher number of grids in real time and can be scaled higher by adding more computation units. This is configurable based on user needs, including the cycle time or how fast a user requires information or data from the system.

As shown in FIG. 1, the process of analyzing rolling elements and gathering information regarding any associated defects can utilize an inspection module 100, computing module 200, and user interface module 300. During step 10, the microscope 105 is used to analyze at least one rolling element 5, and preferably is used to analyze a plurality of rolling elements.

FIGS. 2A-2F illustrate aspects of the microscope 105 and the associated components in further detail. As shown in these drawings, the microscope 105 can include a rolling element manipulator or holder assembly 105b. In one aspect, the holder assembly 105b can remain stationary and float above an automated X-Y stage platform 105a that is configured to rotate or roll the rolling element 5. The automated X-Y stage platform 105a can be configured to move automatically relative to the optical component 105c of the microscope 105 based on input signals. The optical component 105c can include a lens, camera, and/or other optical scanning equipment configured to obtain images or otherwise analyze the rolling element 5. A mount 105d, otherwise known as a bridge or frame, can be provided above the X-Y stage platform 105a, and below the optical component 105c. The mount 105d can be configured to receive or hold the holder assembly 105b.

Figure 2B:
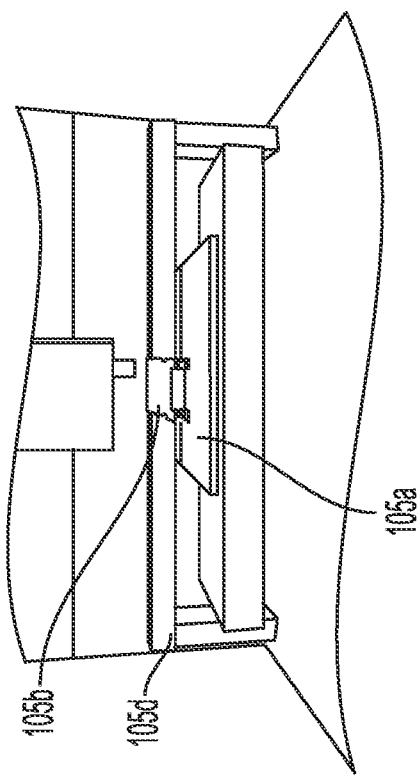
FIG. 2B is a front view of the microscope assembly of FIG. 2A.
Figure 2A:
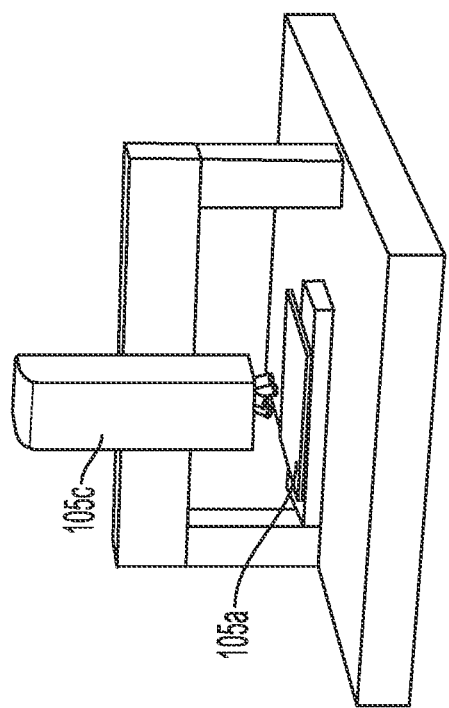
FIG. 2A is a perspective view of a microscope assembly for analyzing rolling elements.
Figure 2C:
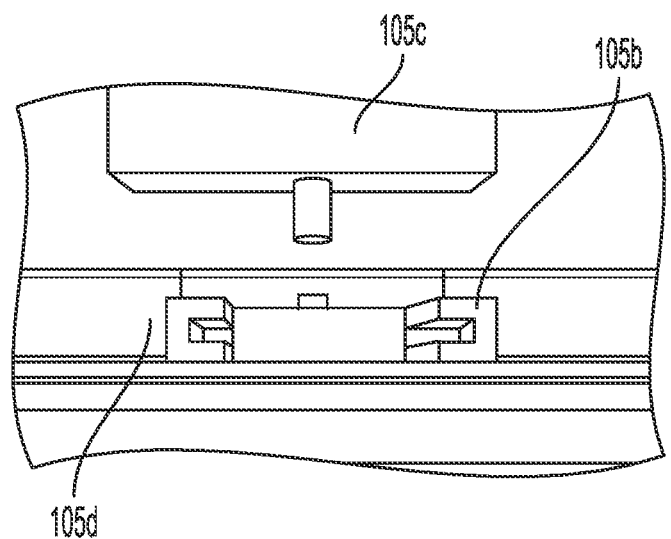
FIG. 2C is a side view of another aspect of the microscope assembly of FIGS. 2A and 2B.
Figure 2D:
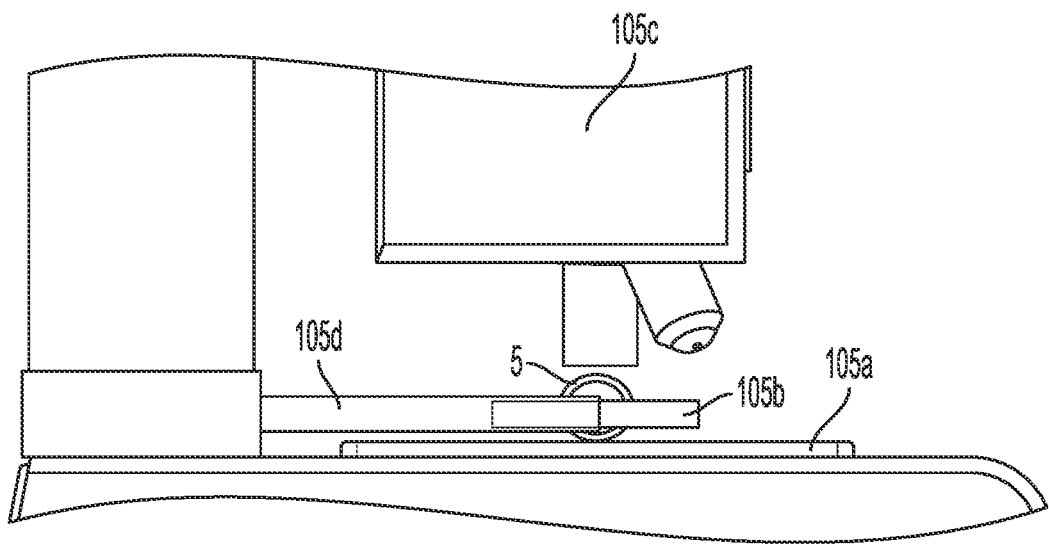
FIG. 2D is another side view of the microscope assembly.
Figure 2E:
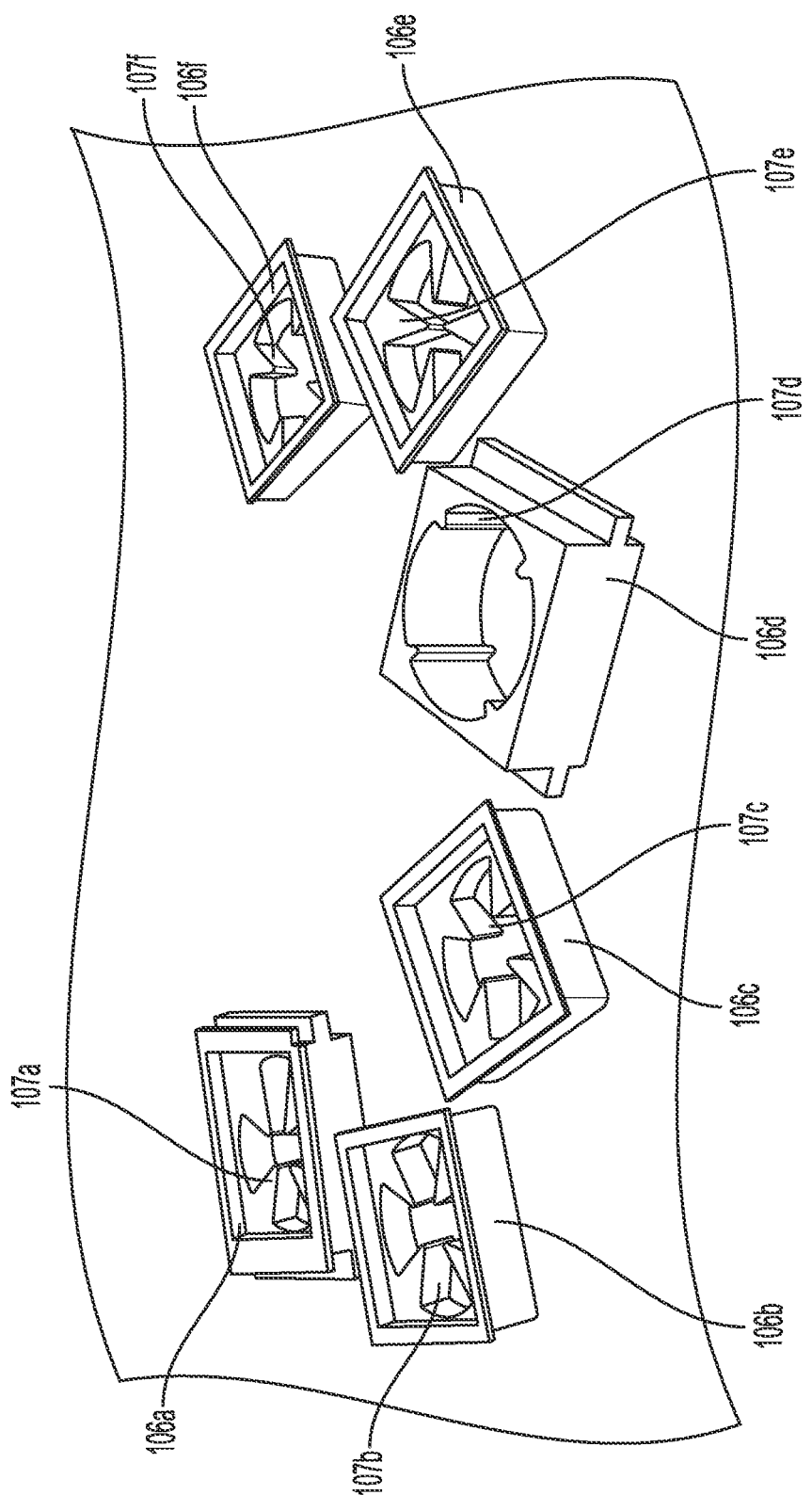
FIG. 2E illustrates a plurality of holder assemblies configured to support rolling elements.
Figure 2F:
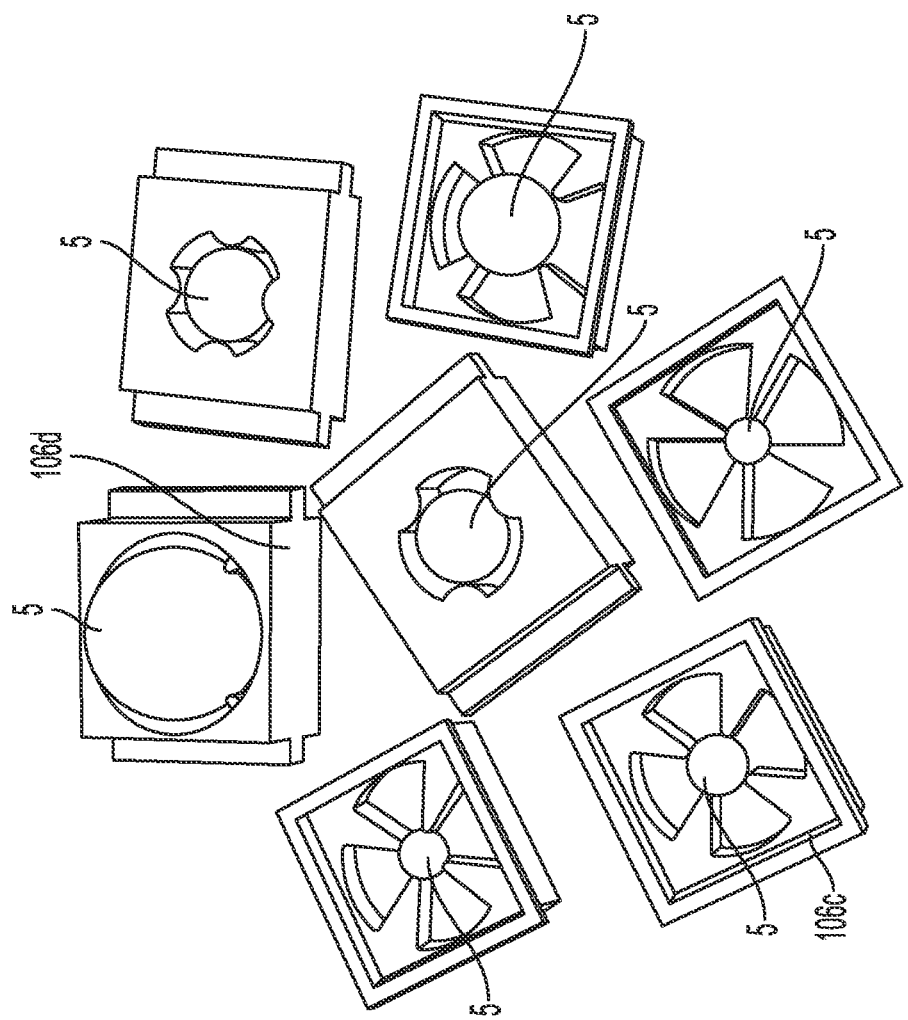
FIG. 2F illustrates the plurality of holder assemblies engaging a plurality of rolling elements.

As shown in FIGS. 2E and 2F, multiple types and sizes of holder assemblies 105b can be provided. FIG. 2E illustrates a plurality of holder assemblies 106a, 106b, 106c, 106d, 106e, 106f. Each of the holder assemblies can include an outer frame and an interior space that is configured to receive a rolling element. Depending on the size of the rolling element to be analyzed, the interior space can vary, as shown by the various holder assemblies 106a-106f. In the interior space, prongs or arms 107a, 107b, 107c, 107d, 107e, 107f can extend inwardly and be configured to engage with the respective rolling elements. The holder assembly 105b can be configured to be attached to a frame or portion of the microscope 105, such as a base or stationary portion. As the X-Y stage platform 105a moves, the holder assembly 105b remains stationary. Due to the arms engaging the rolling element 5 on a side or peripheral surface, the rolling element 5 is configured to be turned or rotated as the X-Y stage platform 105a moves.

During step 10, information or data from the microscope 105 is transmitted (i.e. wirelessly, wired, or through any connection) to the CPU 110. The CPU 110 is generally configured to communicate with the microscope 105, including receiving data and information from the microscope 105 regarding the analyzed rolling elements. The CPU 110 can be configured to receive optical information, such as images of the rolling elements, including a three-dimensional view of the surface area, surface scan information (i.e. at the micron level), and other views of the rolling element. In one aspect, the information regarding the surface of the rolling element is generated as a two-dimensional grid, such as shown in FIG. 3A, via the CPU 110. In this view, each icon 306 represents one specific or unique area of the rolling element surface. In one aspect, each icon 306 represents an area, i.e. microscopic area, of the rolling element surface. In one aspect, each dot or circle (i.e. icon) represents an area of approximately of at least 10× magnification. In one instance, this can correspond to an area of 1.6 mm by 1.6 mm. One of ordinary skill in the art would understand that various magnifications and grid sizes can be used for different types of rolling elements. For example, in one aspect, at least 1,000 sample regions or areas can be analyzed by the system. In a preferred embodiment, at least 1,200 sample regions or areas can be analyzed by the system. This information, including data regarding each surface area as represented by the icon 306, is stored in a file for further processing. The grid can be reproduced, after further processing, to a user on a user interface for further analysis.

During step 15, information or data is automatically transmitted to the database 205. This information can include all imaging related data regarding the rolling element, such as the grid shown in FIG. 3A, and images showing the surface characteristics of the rolling elements.

During step 20, data and information from the database 205 can be transmitted to the processing module 210. The processing module 210 can include the pre-processing engine 210a, the AI vision solution engine 210b, and the post-processing engine 210c. The processing module 210 can be configured to run the AI vision solution engine 210b in a docker containerized environment either in an on-premise EDGE system or in a deployed state in a third-party cloud architecture, such as in a Kubernetes configuration. Communication between the module 210, the user interface 305, and the database 205 can be configured to be processed or handled via Application Programming Interface (API) calls. The processing module 210 can be configured to receive requests from the user interface 305 regarding the inspection grid that is available for processing and metadata to locate it on the storage from the user interface 305. The processing module 210 can be configured to extract stored data from the database 205 and pre-process it to a two-dimensional surface image. The AI vision solution engine 210b can be configured to run a defect scan on the image and generate a collective report, and communicate this information back to the user interface 305, such as via an API response.

During step 25, data and information can be transmitted between the processing module 210 and the user interface 305. An API can be provided that allows users to interact with data and information provided via the processing module 210. For example, using the API, a user can view information regarding the surfaces of the rolling elements. In one aspect, this information can be presented to a user in a 3D model showing the rolling element, or can be provided as a grid, such as shown in FIG. 3A, with each icon representing a specific area of the rolling element. Using this interface, the user can review characteristics of the rolling element. For example, a user can select (such as via engagement with a cursor) a specific portion of the imaging data and review the surface of a specific portion of the rolling element. The processing module 210 can be configured to automatically identify (i.e. flag or otherwise highlight) specific portions of the rolling element that may include a defect or other imperfection. A user can then review these specifically identified portions to determine whether those areas include defects that are sufficient to reject the rolling element. The standard for passing inspection can vary greatly depending on customer requirements, industry requirements, material type, size of rolling element, etc. For example, a user can set a predetermined geometry characteristic which, if triggered, indicates that the particular defect is impermissibly high to allow the rolling element to proceed for further use. In one aspect, the user interface provides a plurality of parameters, such as geometrical characteristics, which can be adjusted to have a higher or lower sensitivity for a particular type of application or rolling element.

During step 30, the process determines whether defects have been found. This process can depend on the user diagnosing whether the surface imperfections or defects found by the processing module 210 are sufficient to qualify as fatal or severe defects (i.e. defects of such a magnitude as to reject the rolling element for use).

In one aspect, the user interface provides an approve/reject feature, option, interface, or button that allows a user to manually select whether to approve or reject a specific rolling element based on the surface defects that were identified. The process is configured to store information regarding whether to accept or reject a specific component along with the surface characteristic information. A feedback loop or step 40 is provided in which if a user rejects a rolling element, then that information is transmitted to CPU 110, i.e. the processor computer in communication with the microscope 105. This information can act as trigger for stopping further data collection because the user has identified the defects and decided to reject the rolling elements.

Step 45 in FIG. 1 represents an analysis step in which information regarding a rejected rolling element is generated and collected, along with the raw or initial surface characteristic data. A report, such as a defect report, can be generated using these parameters that can then be stored in database 310. This procedure provides a fully traceable configuration in which all decisions and defects associated with a particular rolling element or batch of rolling elements can be stored for further review and subsequent analysis. This information can be further processed in order to further improve the accuracy of the system. The database 310 can be connected to the processing module 210, and the user interface 305 such that all data or information stored on database 310 can be transmitted or accessed by these components.

As shown in FIG. 1, if the defect is not sufficient to reject the rolling element, then step 50 shows that this data and information is also stored on database 310.

FIG. 4 illustrates an exemplary workflow 400. As shown in FIG. 4, data is acquired at step 410. In this step, the data can include surface characteristics of the rolling element, as well as geographic locations of said surface characteristics. This information, which can include data set coordination information and locational information, can be stored in a grid pattern, two-dimensional data array, or three-dimensional mapping image. The data in step 410 can be acquired using a confocal microscope assembly, as described herein with respect to the inspection module 100, and its associated components.

Step 420 includes processing of the data from step 410. During this step, the data can be pre-processed. This step can include applying filters to remove noise or other noise removal techniques, segmentation for region of interest modules, drift removal, surface correction, and transformation from curved surface data to flattened surface data. The three-dimensional surface scan information can be mapped into two-dimensional images representing the surface in terms of color mappings. For example, the color red can indicate a deviation in a negative direction (i.e. scratch) from a curved outer surface, and the color blue can indicate a deviation in a positive direction (i.e. bump) from a curved outer surface.

Step 430 can include processing of the two-dimensional color mapped surface scan images. In one aspect, this step is carried out via the processing module 210, and more specifically through the AI vision solution engine 210b. This step can also be configured to identify different types of defects. Step 430 can be configured to provide information about the defect type, location, depth, length, and level of confidence in its prediction to the user interface. In one aspect, a level of confidence is based on the system previously encountering or analyzing similar defects as compared to the currently or presently encountered defect. If a particular defect appears similar in appearance as a defect that has already been encountered by the system, then the level of confidence is relatively higher as compared to a defect that is not similar to previously encountered defects.

Step 440 includes displaying the data to a user via a user interface. This step can include providing a visual mapping of the rolling element and showing the surface characteristic data via a plurality of methods. For example, a model of the rolling element can be generated for a user to manipulate, rotate, or otherwise move in order to view various regions of the rolling element. In one aspect, a grid pattern of all of the regions of the rolling element can be generated. Representative icons can be used to show the various regions of the rolling element. A user can select, such as by clicking a cursor, over a specific region or area of interest on the user interface display. Further information or analysis can be provided to the user during this step, such as specific parameters of the surface defect. All the defect information metadata from the AI vision solution engine 210b is provided to the user in a graphical user interface. For example, the size or depth of the defect on the rolling element can be provided to the user.

Step 450 includes an approval or rejection determination. The user reviews the defect metadata predictions generated by the AI vision solution engine 210b from previous steps and then makes the decision about rejecting or accepting the rolling element. This determination can be selected by a user via the user interface. For example, the user interface can display an "approve" or similar button or function, and a "reject" or similar button or function. The user can select to approve or reject a specific rolling element based on the severity, type, or other aspect of the surface defect. For example, if the surface defect is unacceptably large or severe, then the user may select to reject the rolling element. The specific parameters for accepting or rejecting a specific rolling element may be determined by the class or type of rolling element, and by the desired application or field of use. For example, for high precision applications, the tolerance or acceptability for defects can be much lower than less sensitive or critical applications.

Step 460 includes associating or linking the decisional data from step 440 with the original surface characteristic data from step 410. For example, if a surface defect of a first predetermined size was detected in step 410, then step 450 associates that particular defect and the first predetermined size with the decision to either accept or reject the rolling element from step 440. All the information from step 420 to 440 are synced and stored in a database 310. This information can be used, for example, during offline training, to continuously update and improve the accuracy of the processing module 210 in multiple steps, such as steps 420-440.

A feedback loop of the data from step 470, including the determination to approve or reject a rolling element and the associated surface characteristic data, is then provided back to step 410. Once the user inputs a decision to reject the rolling element, the process can stop and additional information, such as grid data, does not need to be collected. The feedback from step 470 is then transmitted or fed back to step 410, to stop any ongoing real time data collection for the given rolling element.

Figure 5A:
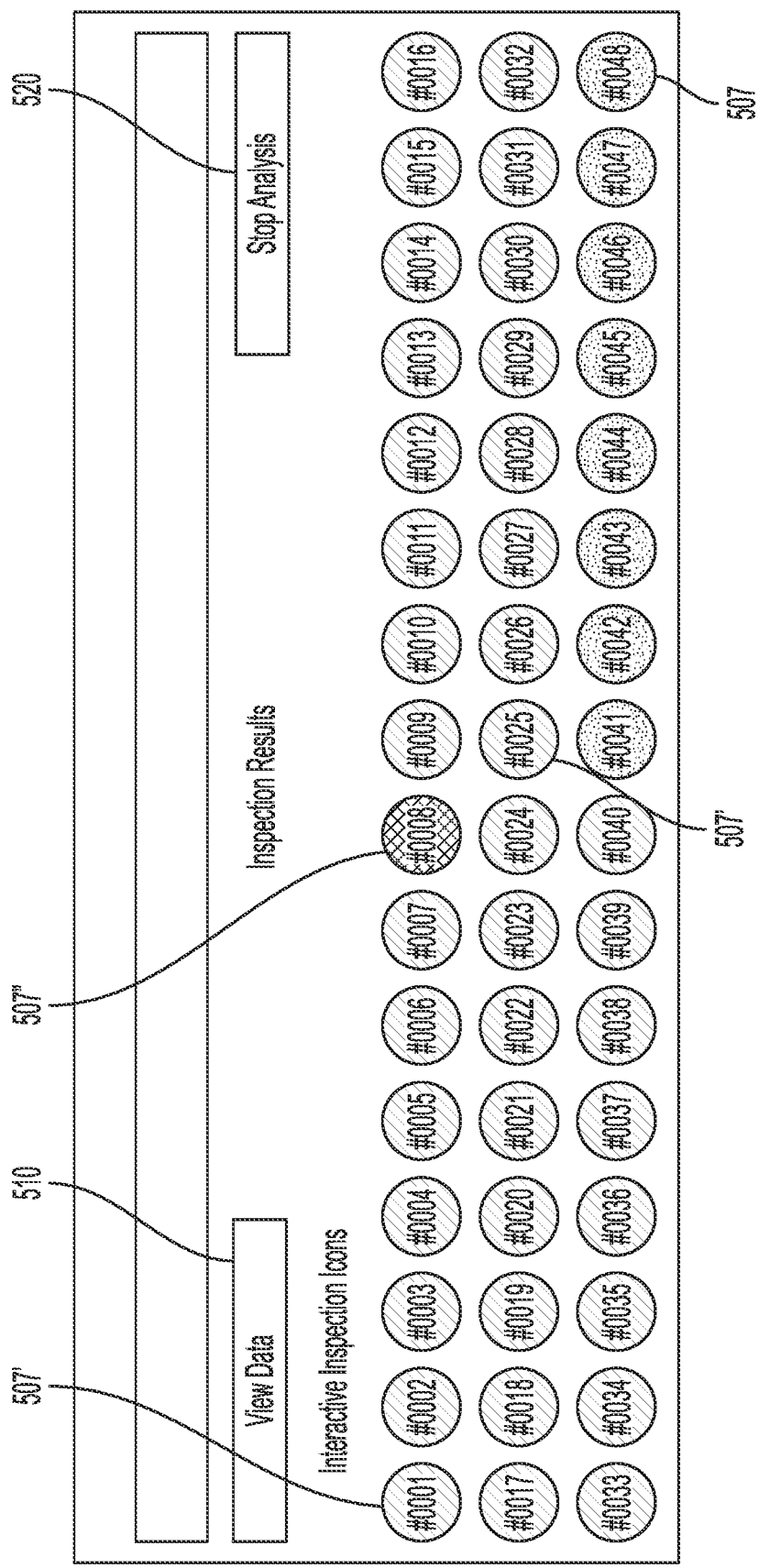
FIG. 5A is a view of a user interface according to one aspect.
Figure 5B:
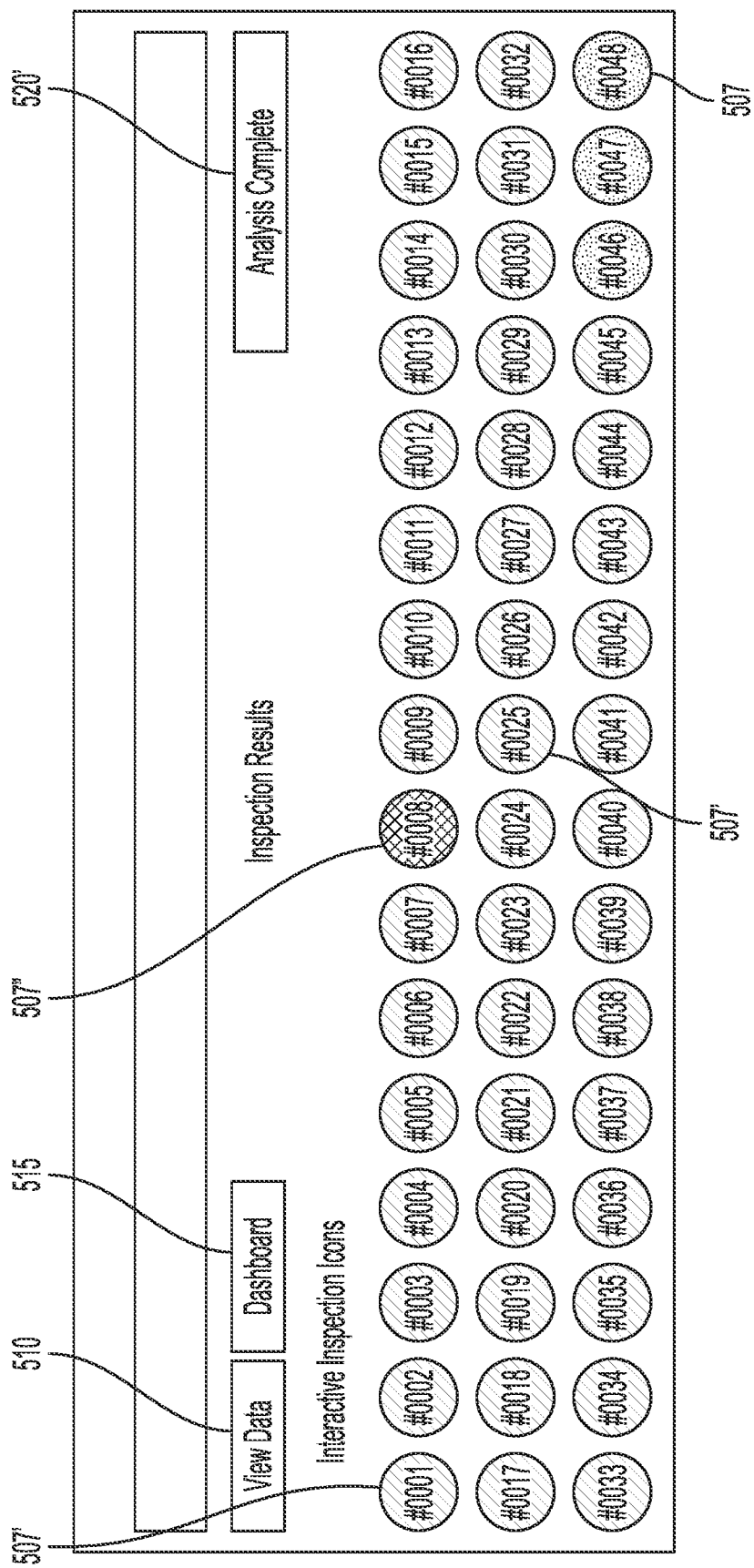
FIG. 5B is a view of a user interface according to another aspect.
Figure 5C:
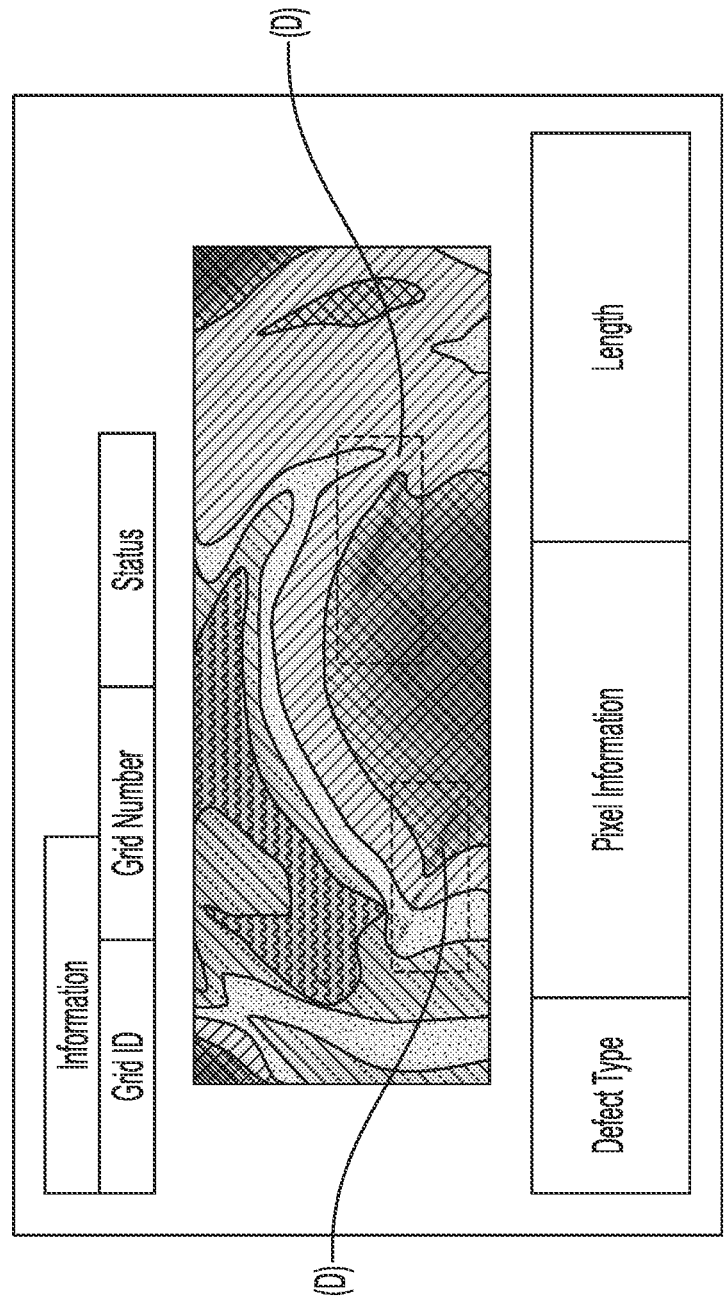
FIG. 5C is an illustration of one portion of a rolling element surface including a defect.

FIGS. 5A, 5B, 5C, and 5D provide further details of the user interface, which can be provided on the user interface 305 or user interface, such as laptops, computers, smartphones or tablet devices. As shown in FIG. 5A, an interface is displayed on a monitor, such as a computer screen or other electronic device. Various functionalities can be implemented on the user interface. A "view data" button 510 can be provided which allows a user to access the data associated with a rolling element, such as surface data collection status, metadata information, two-dimensional surface scan information, defect identification status, etc. Additional buttons can also be provided on the interface. For example, a stop analysis button 520 can be provided that allows a user to stop the analysis process. This button can be configured to restart the analysis as well. These buttons can use API calls for communicating with the user interface 305 and also to any of the databases. A dashboard button 515 can also be provided that allows a user to access a summary report of all the inspections conducted in the given period and corresponding defect status.

On the screen, multiple interactive inspection icons 507 are displayed. Each of these interactive inspection icons are associated with a specific area of a rolling element and can be considered as corresponding to inspection grids. Each of these interactive inspection icons 507 can have some indicia, such as color or hatching, to indicate their particular status. For example, the color green can be used to indicate that no defects were identified by the system, while the color red can be used to indicate that severe defects were identified by the system. Additionally, another color, such as orange or yellow, can be used to indicate that a particular inspection grid requires user attention or input for further analysis. In one aspect, each interactive inspection icons 507 is initially gray, white, or otherwise non-colored if no analysis is available for that particular inspection grid. As the information or data is collected (i.e. images of the rolling element are captured and analyzed), the interactive inspection icons 507 begin to change or update. For example, the interactive inspection icons 507 can turn green if analysis has been carried out and no significant defects were detected by the algorithms and analysis methods. In another aspect, the interactive inspection icons 507 can turn red if a significant surface defect is detected. The interactive inspection icons 507 can change in real time or dynamically as the analysis is carried out. Each interactive inspection icon 507 can be adjusted to show an appropriate status in sequential order. A user can therefore review the status of the rolling element analysis in real time and simultaneously analyze the rolling element inspection grids. For example, if the processing module 210 or other analysis component of the system detects a defect and signifies this via changing the color to red, or a first hatching pattern, for a specific interactive inspection icon 507, then the user can click that specific icon 507" and the system is configured to then display information regarding that specific inspection grid. In one aspect, the icon 507" can be associated with an inspection grid or area of the rolling element as shown in FIG. 5C. As shown in FIG. 5C, the user interface is configured to display the image for specific inspection grids. A defect (D) is shown in FIG. 5C for that specific inspection grid. Further information can be shown on the user interface, including a grid ID, grid number, status, defect type, pixel information or location, and length of the defect.

Figure 5D:
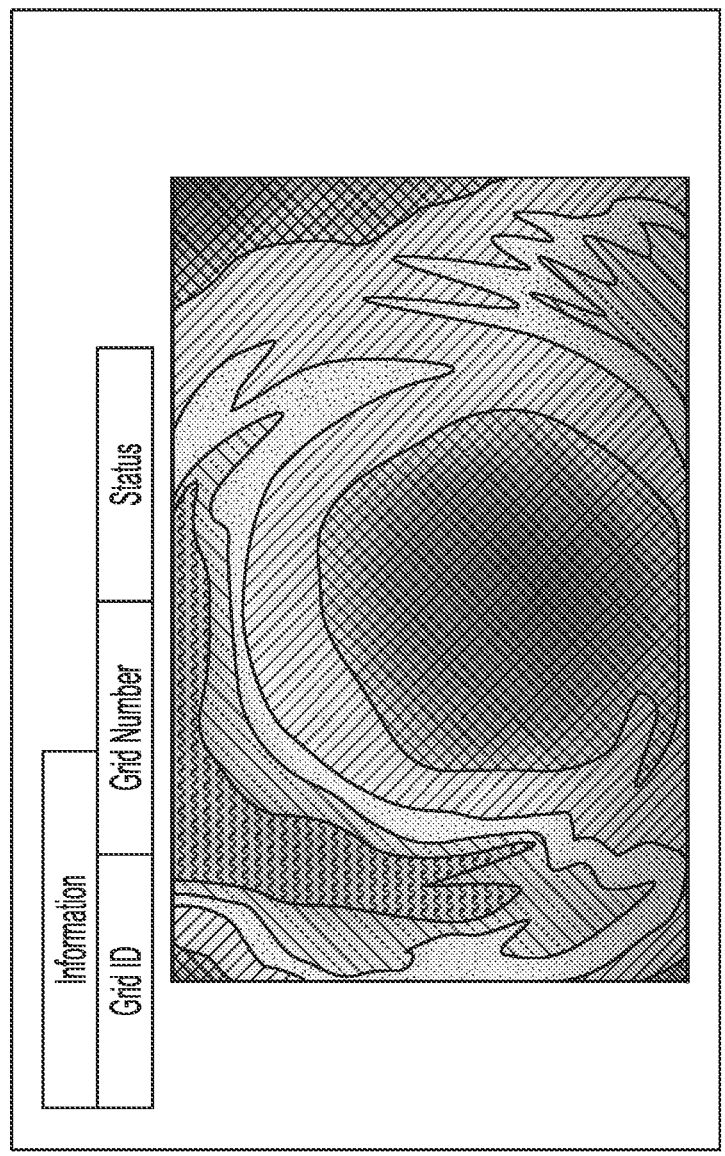
FIG. 5D is an illustration of one portion of a rolling element surface lacking any defects.

The processing module 210 can be configured to measure aspects of the defect based on pixel information and analysis. The user can review this image data and information to determine whether the icon 507" associated with that particular area has a significant defect. In one example, this allows the user to verify the decision made by the processing module 210. The user can additionally access image data associated with interactive inspection icon 507 that were identified as not having any defects, such as icon 507'. Clicking or engaging icon 507' can access additional information, images, or data, such as the information displayed by FIG. 5D. FIG. 5D shows image data or information associated with the icon 507'. As shown in FIG. 5D, the image for that particular inspection grid does not include any significant defects or issues, as compared to FIG. 5C.

The system and processes disclosed herein address costs regarding fixed investment resources that are typically required for inspection of rolling elements, and also provides an improved scalable configuration that will improve over time based on deep learning concepts.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS inspection module 100
microscope 105
X-Y stage platform 105*a*
holder assembly 105*b*
optical component 105*c*
mount 105*d*
holder assemblies 106*a*-106*f*
arms 107*a*-107*f*
CPU 110
computing module 200
database 205
processing module 210
pre-processing engine 210*a*
AI vision solution engine 210*b*
post-processing engine 210*c*
user interface module 300
user interface 305
icon 306
interactive inspection icon 307
characteristic or visual indicia 307', 307"
local database 310
database 320
icons 507, 507', 507"
buttons 510, 515, 520

What is claimed is:

1. A method of detecting defects in a rolling element, the method comprising:
(i) scanning an outer surface of a rolling element via a microscope assembly to obtain a plurality of surface images of the rolling element;
(ii) associating each of the plurality of surface images with a specific region of the rolling element, wherein the plurality of surface images are stored in a database;
(iii) identifying defects based on the plurality of surface images via a processing module using an initial set of analysis parameters;
(iv) generating a plurality of interactive inspection icons associated with the plurality of surface images that each correspond to a unique geographic region of the rolling element, and displaying the plurality of interactive inspection icons via a user interface, wherein the user interface includes an input interface including an approve option and a rejection option;
(v) storing decisional information regarding selection of the approve option and the rejection option from the input interface in the database; and
(vi) updating the initial set of analysis parameters based on the decisional information;
wherein step (iii) further comprises identifying the defects via an AI vision solution engine that is configured to identify defects based on analysis parameters.

2. The method according to claim 1, wherein step (ii) further comprises providing the plurality of surface images to the database in real time.

3. The method according to claim 1, wherein the user interface is configured to display a two-dimensional image associated with the plurality of surface images.

4. The method according to claim 1, wherein the user interface is configured to display a three-dimensional image of the plurality of surface images.

5. The method according to claim 1, wherein the plurality of interactive inspection icons are generated and displayed in real-time while the microscope assembly scans the rolling element.

6. The method according to claim 1, wherein step (iii) includes identifying at least one of: (i) a defect type on the outer surface of the rolling element, or (ii) a size of a defect on the outer surface of the rolling element.

7. The method according to claim 1, wherein the plurality of interactive inspection icons are configured to include at least one indicia that is representative of a defect condition.

8. The method according to claim 7, wherein the at least one indicia is configured to correspond to a level of severity of any defects on the outer surface of the rolling element in a specific geographic region.

9. The method according to claim 8, wherein at least one visual characteristic of the plurality of interactive inspection icons is configured to modified based on the level of severity of any defects.

10. The method according to claim 8, further comprising generating and displaying additional information regarding the corresponding geographic region of the rolling element via engagement of the plurality of interactive inspection icons on the user interface.

11. The method according to claim 10, further comprising displaying at least one image of the corresponding geographic region of the rolling element based on engagement of the plurality of interactive inspection icons on the user interface.

12. A method of detecting defects in a rolling element, the method comprising:
(i) scanning an outer surface of a rolling element via a microscope assembly to obtain a plurality of surface images of the rolling element;
(ii) associating each of the plurality of surface images with a specific region of the rolling element, wherein the plurality of surface images are stored in a database;
(iii) identifying defects based on the plurality of surface images via a processing module using an initial set of analysis parameters;
(iv) generating a plurality of interactive inspection icons associated with the plurality of surface images that each correspond to a unique geographic region of the rolling element, and displaying the plurality of interactive inspection icons via a user interface, wherein the user interface includes an input interface including an approve option and a rejection option;
(v) storing decisional information regarding selection of the approve option and the rejection option from the input interface in the database; and
(vi) updating the initial set of analysis parameters based on the decisional information; and
generating a report including the surface images and the decisional information.

13. The method according to claim 1, wherein the microscope assembly incudes a mobile stage platform and a holder assembly including at least one arm configured to engage a peripheral surface of the rolling element, such that the rolling element is configured to be rotated via the mobile stage platform of the microscope assembly.

14. A method of detecting defects in a rolling element, the method comprising:
(i) scanning an outer surface of a rolling element via a microscope assembly to obtain a plurality of surface images of the rolling element;
(ii) associating each of the plurality of surface images with a specific region of the rolling element, wherein the plurality of surface images are stored in a database;
(iii) identifying defects based on the plurality of surface images via a processing module using an initial set of analysis parameters;
(iv) generating a plurality of interactive inspection icons associated with the plurality of surface images that each correspond to a unique geographic region of the rolling element and displaying the plurality of interactive inspection icons via a user interface, wherein the user interface includes an input interface including an approve option and a rejection option;
(v) storing decisional information regarding selection of the approve option and the rejection option from the input interface in the database; and
(vi) updating the initial set of analysis parameters based on the decisional information;
wherein the plurality of interactive inspection icons are configured to include at least one indicia that is representative of a defect condition; and
wherein the at least one indicia is configured to correspond to a level of severity of any defects on the outer surface of the rolling element in a specific geographic region.

15. The method according to claim 14, wherein step (iii) further comprises detecting a type of defect identified on the rolling element.

16. The method according to claim 14, wherein the plurality of interactive inspection icons are initially a first color, and are modified to display a second color to indicate a defect is detected or a third color to indicate a defect is not detected.

17. The method according to claim 14, wherein the user interface includes a plurality of buttons, wherein a first button is configured to stop step (i), and a second button is configured to display images obtained during step (i).

18. The method according to claim 14, wherein at least 1,000 regions are identified during step (ii).

19. The method according to claim 14, further comprising calculating a depth and a width of any defects identified during step (iii).

20. The method according to claim 14, wherein the plurality of interactive inspection icons are modified in real time with indicia associated with any defects identified during step (iii).

* * * * *